US008268130B2

(12) United States Patent
Sinkko et al.

(10) Patent No.: US 8,268,130 B2
(45) Date of Patent: Sep. 18, 2012

(54) PAPER AND METHOD FOR MAKING PAPER

(75) Inventors: Tarja Sinkko, Lappeenranta (FI);
Mikko Oksanen, Lappeenranta (FI);
Janne Varvemaa, Lappeenranta (FI);
Kyösti Haapoja, Valkeakoski (FI);
Teuvo Leppänen, Taavetti (FI)

(73) Assignee: UPM-Kymmene Oyj, Helsinki (FI)

( * ) Notice: Subject to any disclaimer, the term of this patent is extended or adjusted under 35 U.S.C. 154(b) by 135 days.

(21) Appl. No.: 12/597,719

(22) PCT Filed: Apr. 25, 2008

(86) PCT No.: PCT/FI2008/050228
§ 371 (c)(1),
(2), (4) Date: Jan. 14, 2010

(87) PCT Pub. No.: WO2008/132283
PCT Pub. Date: Nov. 6, 2008

(65) Prior Publication Data
US 2010/0112243 A1 May 6, 2010

Related U.S. Application Data

(60) Provisional application No. 61/022,403, filed on Jan. 21, 2008.

(30) Foreign Application Priority Data

Apr. 25, 2007 (FI) ..................................... 20075286

(51) Int. Cl.
*D21H 11/00* (2006.01)
(52) U.S. Cl. ..................................... 162/164.1
(58) Field of Classification Search ............... 162/164.1; 428/537.7, 537.5, 32.1
See application file for complete search history.

(56) References Cited

U.S. PATENT DOCUMENTS

| 3,784,596 A | 1/1974 | Nagler |
| 4,460,637 A | 7/1984 | Miyamoto et al. |
| 5,334,449 A | 8/1994 | Bergmann et al. |
| 5,468,564 A | 11/1995 | Ohtani et al. |
| 5,614,325 A | 3/1997 | Chartier et al. |
| 5,858,555 A | 1/1999 | Kuroyama et al. |
| 5,972,147 A | 10/1999 | Janis |
| 6,465,086 B1 | 10/2002 | Kitamura et al. |
| 6,616,749 B1 | 9/2003 | Husband et al. |
| 6,767,618 B2 | 7/2004 | Ishige et al. |
| 2002/0182382 A1 | 12/2002 | Hirabayashi et al. |
| 2005/0191469 A1 | 9/2005 | Anttila et al. |
| 2006/0014004 A1 | 1/2006 | Iwasa et al. |
| 2006/0122059 A1 | 6/2006 | Mathur et al. |
| 2006/0251819 A1 | 11/2006 | Zama et al. |
| 2010/0189969 A1 | 7/2010 | Oksanen et al. |

FOREIGN PATENT DOCUMENTS

| CN | 1630757 A | 6/2005 |
| EP | 0 179 597 A2 | 4/1986 |
| EP | 1 026 003 A2 | 8/2000 |
| EP | 1 743 976 A1 | 1/2007 |
| JP | 8-027694 A | 1/1996 |
| JP | 8-132730 A | 5/1996 |
| JP | 2000-045199 A | 2/2000 |
| JP | 2000-226792 A | 8/2000 |
| JP | 2003-113594 A | 4/2003 |
| JP | 2004-011053 A | 1/2004 |
| JP | 2004-204409 A | 7/2004 |
| JP | 2005-530934 A | 10/2005 |
| WO | WO 2004/003293 A1 | 1/2004 |

OTHER PUBLICATIONS

Japanese Office Action for corresponding Japanese Patent Application No. 2010-504775 mailed Jan. 10, 2012.

*Primary Examiner* — Mark Halpern
(74) *Attorney, Agent, or Firm* — Merchant & Gould P.C.

(57) ABSTRACT

The invention relates to a paper that is formed of a fiber-based source material and is applicable as printing paper. According to the invention, the surface of the paper is surface-treated by arranging sufficient density on the surface, such that a mixture is arranged at least on one side of the surface of the paper for forming a surface layer, which mixture comprises pigments in an amount of 75-95% by weight of the dry weight and bonding agent in an amount of 5-25% by weight of the dry weight, and the porosity of the surface layer of the paper is less than 0.07 ml/g as defined by mercury porosimeter process. Furthermore, the invention relates to a method for making paper.

12 Claims, 2 Drawing Sheets

PAPER AND METHOD FOR MAKING PAPER

Figure 1:
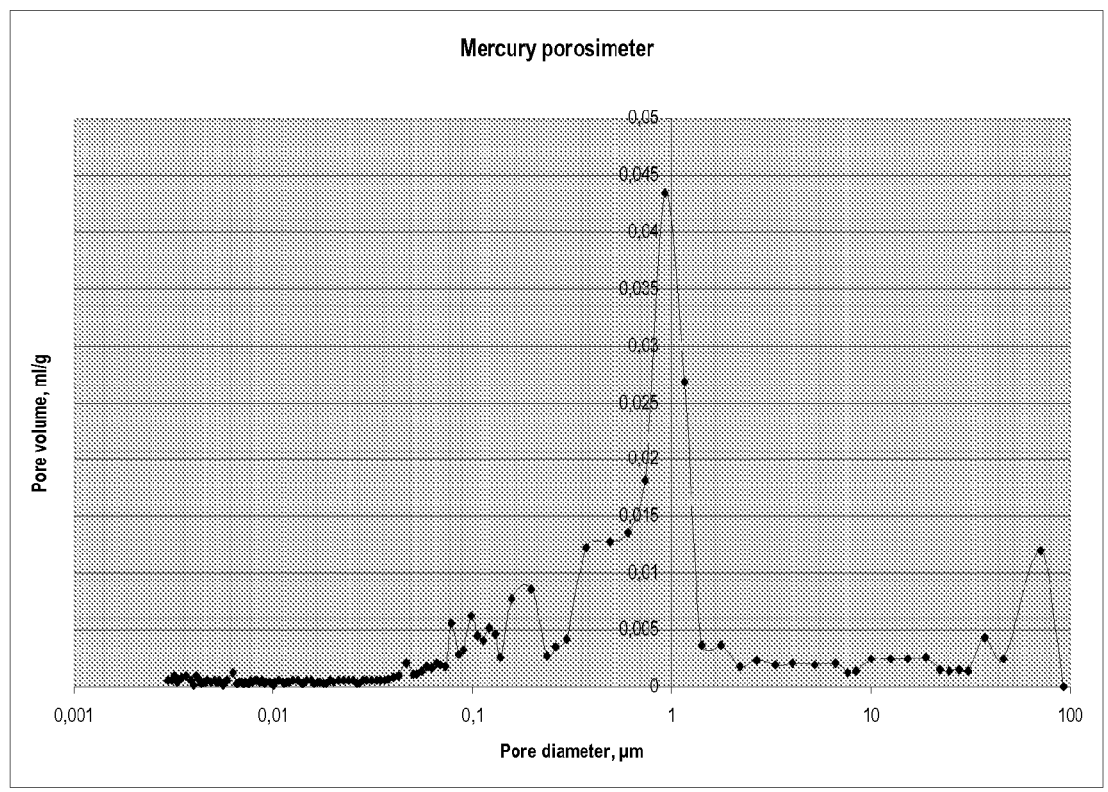

This application is a National Stage Application of PCT/FI2008/050228, filed Apr. 25, 2008, which claims benefit of Ser. No. 61/022,403, filed Jan. 21, 2008 in the United States of America and which claims benefit of Serial No. 20075286, filed Apr. 25, 2007 in Finland which applications are incorporated herein by reference. To the extent appropriate, a claim of priority is made to each of the above disclosed applications.

FIELD OF THE INVENTION

The invention relates to paper and the method for making paper, wherein paper that is applicable as printing paper is formed of fibre-based source material.

BACKGROUND OF THE INVENTION

Known from prior art are different printing papers for use in printing and different methods for making papers.

In the printing art, different printing methods for paper are known, e.g. Offset or gravure techniques. In the known methods, specifically in HSWO printing, printing inks are dried at high temperatures, typically at 120-150° C., which provides high moisture gradient between the printed and non-printed areas during drying of the printing ink. The high moisture gradient thus provided constitutes an important factor that weakens the quality of the HSWO print, namely waving. There are many known ways which aim at reducing the waving.

Reference publication WO 2004/003293 discloses a dense paper with an oleophilic surface. The Gurley-Hill permeance value on the surface is higher than 5000 s/100 ml. Forming a dense paper with an oleophilic surface is expensive and has not been realized industrially.

OBJECTIVE OF THE INVENTION

The objective of the invention is to disclose a new type of paper applicable as printing paper in printing. One specific objective of the invention is to disclose a paper that allows minimizing the moisture gradient between printed and non-printed surface and avoiding waving e.g. in HSWO printing. One further objective of the invention is to disclose a new method for making paper.

SUMMARY OF THE INVENTION

The paper and method according to the invention are characterized by what has been presented in the claims.

The invention is based on a paper that is formed of a fibre-based source material and is applicable as printing paper. According to the invention, the surface of the paper is surface-treated by arranging a sufficient density on the surface, by arranging a mixture, preferably by coating, at least on one side of the surface of the paper for forming a surface layer, which mixture comprises pigment in an amount of 75-95% by weight of the dry weight and bonding agent in an amount of 5-25% by weight of the dry weight, and the porosity of the surface layer is less than 0.07 ml/g as defined by a mercury porosimeter process.

In this context, surface layer of the paper refers to the surface layer on the surface of the paper, e.g. a coating layer, that may have been formed by any surface treatment process known per se.

The invention is specifically based on paper in which the surface is arranged to be dense and which comprises controlled surface density. Furthermore, the surface energy properties of the paper are preferably controlled. Preferably, the surface of the paper does not have any oleophilic properties.

In the paper according to the invention, the moisture gradient, i.e. drying gradient, between the printed and non-printed surface can be minimized, and waving can be reduced e.g. in HSWO printing. Minimizing the moisture gradient becomes possible by providing the density to the paper in a specific manner. With dense paper surface, it is possible to slow down drying of the non-printed surface relative to the printed surface, so that the moisture gradient can be reduced e.g. in HSWO drying. By reducing the moisture gradient, it is possible to reduce waving in the paper.

In this context, paper refers to any fibre-based paper. The paper may have been made from chemical pulp, mechanical pulp, chemimechanical pulp, recycled pulp and mixtures thereof and/or the like. The paper may be in the form of a wet web, dried web or sheet, or in other form which is suitable for the purpose. The paper may comprise suitable fillers and additives.

The paper is surface-treated by coating, so that a surface layer, i.e. coating layer, is formed on the surface of the paper. In one preferred embodiment, the paper is coated, and more preferably lightly coated. The paper is preferably single coated.

In one embodiment, the coat weight is 1-14 g/m$^2$/side.

Preferably, the proportions of the pigment and bonding agent are predetermined and -set.

In one embodiment of the invention, the pigment is selected from the group of: kaolines, talcs, calcium carbonates, gypsum, and mixtures thereof and the like. In one preferred embodiment, the pigment comprises mainly kaoline. In one embodiment, plate-shaped pigment is used at least partly or entirely as the pigment. In one embodiment, substantially plate-shaped pigment is used, in a preferred embodiment the plate-shaped pigment is present in an amount of over 70% by weight of the amount of pigment, in a more preferred embodiment in an amount of over 90% by weight of the amount of pigment. In one embodiment, the pigment may comprise spherical pigment.

In one embodiment of the invention, the bonding agent is selected from the group of: starches, proteins, latexes, carboxy-methyl cellulose, polyvinyl alcohol, and mixtures thereof and the like. In one preferred embodiment, the bonding agent comprises mainly latex or the derivatives thereof, e.g. SB latex.

In one embodiment, the bonding agent comprises latex having the glass transition temperature in the range of −30-35° C., more preferably in the range of 0-25° C. The glass transition temperature may be defined e.g. by differential scanning calorimetry (DSC).

Preferably, the density of the surface of the paper is controlled by optimizing the source material composition in the coating mixture by the bonding agent—pigment combination. In one embodiment of the invention, the mixture arranged on the surface of the paper comprises pigment in an amount of 82-92% by weight of the total dry weight of the mixture, more preferably about 83-85% by weight. The pigment may be in solid or in dispersion form, and it may be present as a composition in which the pigment comprises 30-100% by weight. In one embodiment of the invention, the mixture comprises bonding agent in an amount of 8-17% by weight of the total dry weight of the mixture, more preferably about 13-15% by weight. The bonding agent may be in solid or in solution form and it may be present as a composition comprising bonding agent in an amount of 3-100% by weight.

Any suitable bonding agents and pigments can be used in the surface-treatment of the paper. Furthermore, suitable additives known per se in the art can be added e.g. to the coating mixture during the surface treatment. The mixture may comprise additives in an amount of 0-10% by weight.

In one embodiment of the invention, the porosity of the surface layer of the paper is less than 0.06 ml/g as determined by the mercury porosimeter process. The mercury porosimeter allows the determination of porosity and pore size distributions.

In one embodiment of the invention, the paper is calendered, preferably after the surface treatment.

In one embodiment of the invention, the paper can be used as printing paper in Offset printing, specifically HSWO printing.

In the manufacture of the paper according to the invention, the so-called base paper used may be a suitable fibre-based base paper which can be formed according to the invention into paper that is applicable as printing paper, such as LWC (Light Weight Coated), MWC (Medium Weight Coated), MFC (Machine Finished Coated), WFC paper (Wood Free Coated) or similar paper.

In one embodiment, fillers, pigments, bonding agents and/or other chemicals are added to the fibre-based source material in the manufacture of the paper. Any agents and chemicals known in the art may be used as fillers, pigments, bonding agents and chemicals.

Furthermore, the invention is based on a method for making paper, wherein paper that is applicable as printing paper is formed of a fibre-based source material. According to the invention, the paper is surface-treated by arranging a mixture, preferably by coating, at least on one side of the surface of the paper for forming a surface layer, which mixture comprises pigment in an amount of 75-95% by weight of the dry weight and bonding agent in an amount of 5-25% by weight of the dry weight, in order to provide sufficient density on the surface of the paper, such that the porosity of the surface layer is less than 0.07 ml/g as defined by the mercury porosimeter process.

The manufacture, surface treatment, coating, calendering and/or printing etc. of the paper may be performed in manners known per se in the art.

In coating the paper, any coating process can be applied, e.g. film transfer coating, blade coating with nozzle applicator, blade coating with roll applicator, blade coating with SDTA (short dwell time application), spray coating, or curtain coating or similar processes.

The paper and method according to the invention provide considerable advantages compared to the prior art.

The paper according to the invention is substantially dense. Thanks to the paper according to the invention, high-quality printed matter and reduction of waving in printed paper are provided. Minimizing the moisture gradient reduces the amount of energy required in the drying, because the drying is more biased towards the surface of the printed paper. Furthermore, excessive evaporation of water from the paper would weaken the printing quality of the paper.

The invention provides a simple and cost-effective way of making high-quality paper that is applicable as printing paper. Furthermore, the invention provides an industrially applicable, easy, simple and affordable way of making paper.

DETAILED DESCRIPTION OF THE INVENTION

Figure 2:
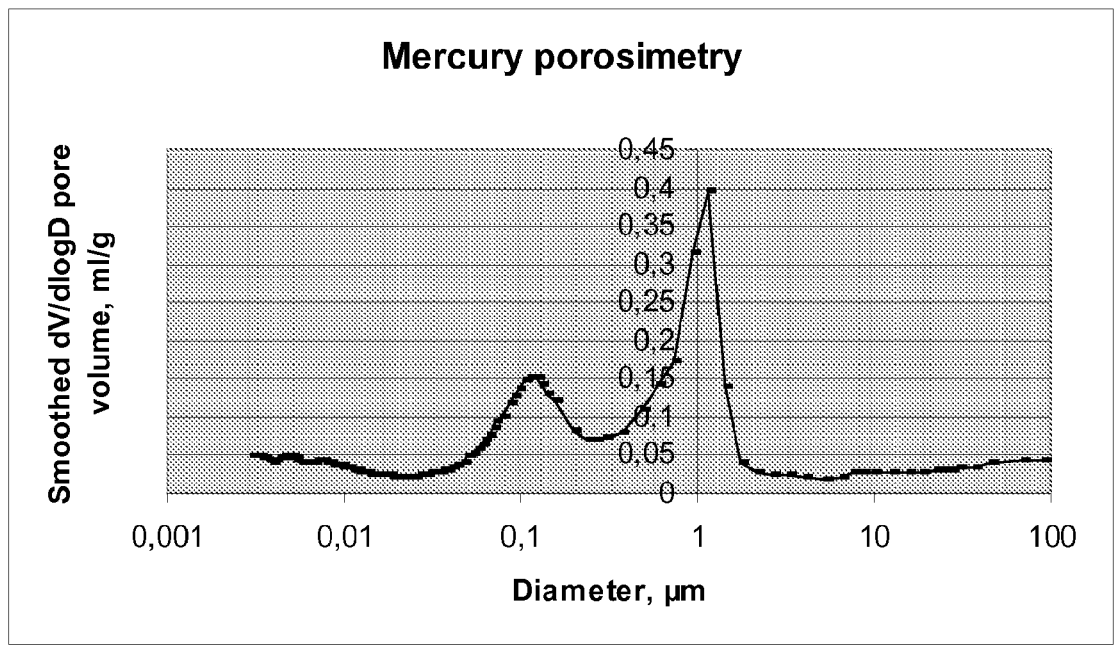

In the following section, the invention will be described with the aid of detailed exemplary embodiments with reference to the accompanying drawings in which FIG. 1 shows rough measurement data of the pore size distribution curve measured by a mercury porosimeter from the coating layer of the paper, and FIG. 2 shows the pore size distribution curve according to FIG. 1 that is smoothed.

EXAMPLE 1

In this example, LWC-type paper having the grammage of about 65 gsm and being applicable as printing paper was formed of mechanical pulp known per se. The wood-containing base paper was lightly single coated with a mixture of pigment/bonding agent, the coat weight being 11 g/m$^2$/side. The pigment used was kaoline and/or talc. Alternatively, any pigment known per se can be used as the pigment. The bonding agent used was SB latex.

Two different coating mixtures were formed containing a) 40 parts kaoline, 60 parts talc and 14 parts bonding agent; and b) 100 parts kaoline and 14 parts bonding agent. The kaolines used had the particle size distribution in which the portion of the particles of less than 2 µm was 85-95% as measured by a Sedigraph 5100 device. Furthermore, the coating mixtures included 2.1-2.6 parts additives known per se. The solids content in the coating mixtures was in the range of 58-60 percent by weight.

After coating, the paper was supercalendered.

In this test, the porosity of the coating layer of the paper was determined by using two mercury porosimeter apparatuses provided by Mercury: Micromeritics Autopore III and Pascal series 140/440. The results corresponded well with each other. It was observed that the obtained results were well reproducible irrespective of the device.

The porosity obtained for the coating layer in the paper samples according to the invention was: a) 0.044 ml/g and b) 0.052 ml/g.

The reference paper used was the corresponding wood-containing LWC paper in which the coating mixture comprised 60 parts Century kaoline, 40 parts Covercarb 75 calcium carbonate and 12 parts DL966 latex. Furthermore, the coating mixture included 1.5 parts additives known per se. The wood-containing base paper was blade coated, the coat weight being 11 g/m$^2$/side. The coated paper was supercalendered to the gloss level of 65%. The porosity of the coating layer in the reference paper was determined as over 0.07 ml/g by the mercury porosimeter provided by Mercury.

The porosities measured by the mercury porosimeter and presented in FIGS. 1 and 2 are derived from the measurement of the reference paper. The curves include pore size distribution measured from the entire paper. FIG. 2 shows clearly two peaks. The first peak, about 0.1 µm, corresponds with the porosity of the coating layer, and the second peak, about 1 µm, corresponds with the porosity of the base paper. The porosity of the coating is calculated from the rough measurement data of FIG. 1. The porosity of the coating settles in the figure between 0.02-0.25 µm. The influence of the base paper on the porosity was insignificant between 0.02-0.25 µm. The porosity of the coating was determined as cumulative porosity between 0.02-0.25 µm.

EXAMPLE 2

In this example, single coated LWC-type paper according to the invention that was applicable as printing paper, with the grammage of about 65 gsm, was formed. The base paper was wood-containing. The coating mixture used in the printing paper according to the invention was a mixture including 100 parts plate-shaped kaoline pigment, 16 parts SB latex as a bonding agent and 3.3 parts additives, e.g. rheology modifiers and dyes. The particle size distribution of the pigment was as presented in Table 1 as measured by the Sedigraph 5100 device.

The reference paper used was single coated wood-containing LWC paper with the grammage of 65 gsm. The coating layer was the typical mixture of kaoline and carbonate.

The papers were single coated by blade coating, using an SDTA coating head. The coat weight was 11 g/m$^2$/side. After coating, the papers were supercalendered, and the calendering conditions were selected to obtain the gloss level of 65%.

TABLE 1

| Particle size, µm | Cumulative distribution, % |
|---|---|
| less than 10 | 100 |
| less than 5 | 99.6 |
| less than 2 | 86.7 |
| less than 1 | 71.3 |
| less than 0.5 | 53.8 |

The porosity of the coating layers of the papers was determined in the printing paper according to the invention to be 0.053 ml/g and in the reference paper 0.077 ml/g as measured by the mercury porosimeter.

The papers were printed by HSWO printing, using the Albert Frakenthal A 101 S printing machine. Commercial HSWO printing colour was used in the printing. The exit temperature of the web was 130° C. after drying.

After printing, considerable improvement in terms of waving was observed in the printing paper according to the invention during visual inspection when the printing paper according to the invention was compared with the reference paper. Waving can be measured e.g. by AFT process, by determining the AFT value after printing and drying.

The manufacture, coating, calendering and printing of the paper were performed in manners known per se and are not described in any more detail in this context.

In all tests, the papers according to the invention proved to be good printing papers on the base of waving of the paper and evenness and sharpness of the print.

In the tests it was observed that waving was low in HSWO printing due to the dense surface structure of the paper and the low moisture gradient between printed and non-printed surface.

In summary, one can conclude that the method according to the invention provides easily good-quality printing paper.

The paper and method according to the invention are applicable in different embodiments for making most different kinds of printing paper products.

The invention is not limited merely to the example referred to above; instead many variations are possible within the scope of the inventive idea defined by the claims.

The invention claimed is:

1. A paper that is formed of a fibre-based source material and is applicable as printing paper, wherein the surface of the paper is surface-treated by arranging a sufficient density on the surface, such that a mixture is arranged at least on one side of the surface of the paper for forming a surface layer, wherein the mixture comprises a pigment in an amount of 75-95% by weight based on the total dry weight of the mixture and a bonding agent in an amount of 5-25% by weight based on the total dry weight of the mixture, and the porosity of the surface layer of the paper is less than 0.07 ml/g as defined by mercury porosimeter process, and wherein the paper is applicable as printing paper in HSWO printing.

2. The paper according to claim 1, wherein the porosity of the surface layer of the paper is less than 0.06 ml/g as defined by the mercury porosimeter process.

3. The paper according claim 1, wherein the pigment is selected from the group of: kaolines, talcs, carbonates, gypsum and mixtures thereof.

4. The paper according to claim 1, wherein a plate-shaped pigment is used at least partly as the pigment.

5. The paper according to claim 1, wherein the bonding agent is selected from the group of: starches, proteins, latexes, carboxy-methyl cellulose, polyvinyl alcohol, mixtures thereof and the like.

6. The paper according to claim 1, wherein the mixture comprises pigment in an amount of 82-92% by weight based on the total dry weight of the mixture.

7. The paper according to claim 1, wherein the mixture comprises the bonding agent in an amount of 8-17% by weight based on the total dry weight of the mixture.

8. The paper according to claim 1, wherein the paper is calendered.

9. A method for making paper, wherein paper that is applicable as printing paper is formed of a fibre-based source material, wherein paper is surface-treated such that it is coated at least on one side with a mixture comprising a pigment in an amount of 75-95% by weight based on the total dry weight of the mixture and a bonding agent in an amount of 5-25% by weight based on the total dry weight of the mixture, for arranging sufficient density on the surface of the paper and forming a surface layer in such manner that the porosity of the surface layer is less than 0.07 ml/g as defined by mercury porosimeter process, and wherein the paper is applicable as printing paper in HSWO printing.

10. The method according to claim 9, wherein sufficient density is arranged on the surface layer of the paper in such manner that the porosity of the surface layer is less than 0.06 ml/g as defined by the mercury porosimeter process.

11. The method according to claim 9, wherein the ratio of the pigment to the bonding agent is controlled.

12. The method according claim 9, wherein the paper is calendered.

* * * * *